April 28, 1942.    F. C. JACOBS    2,281,195
PACKING
Filed Feb. 2, 1940
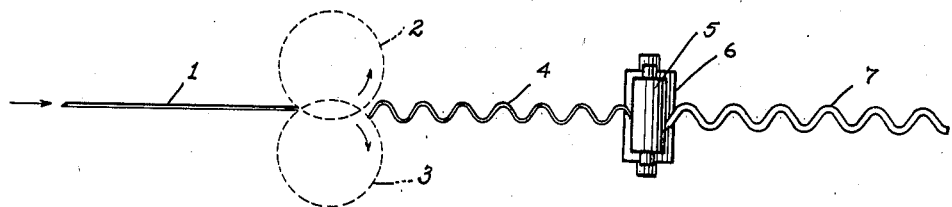
Fig. I.
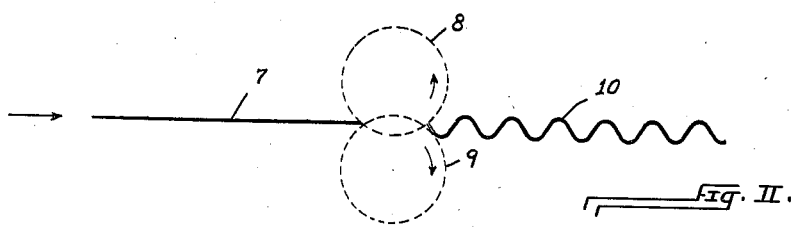
Fig. II.
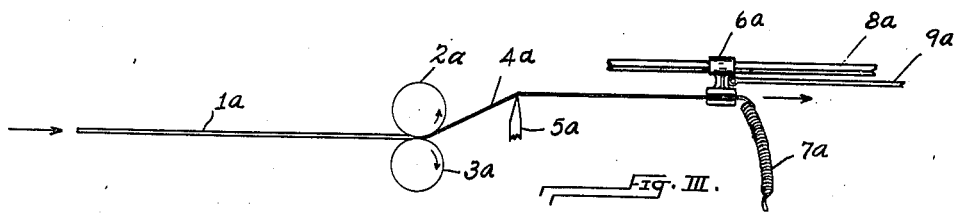
Fig. III.
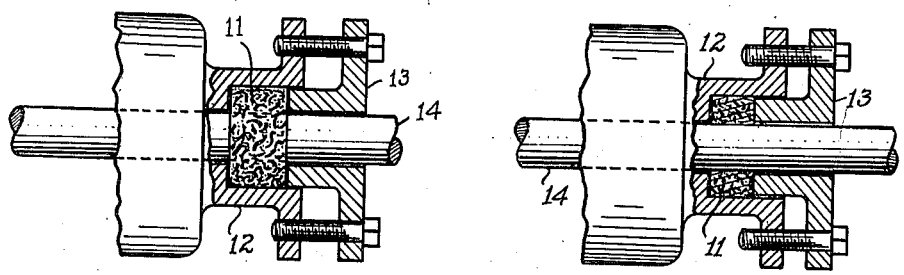
Fig. IV.
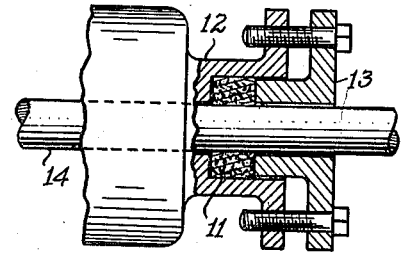
Fig. V.
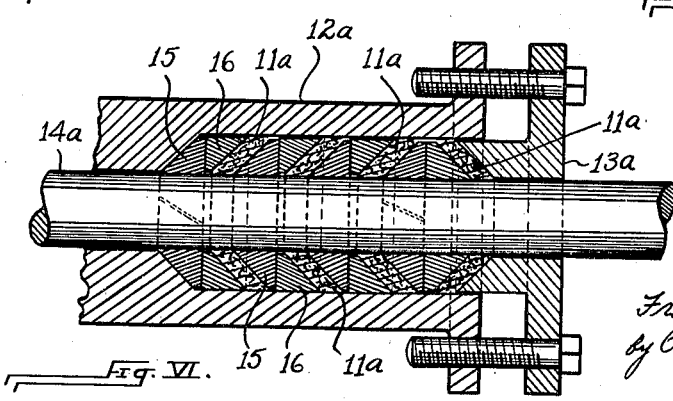
Fig. VI.
INVENTOR
Frank C. Jacobs
by Christy and Marton
his attorneys Patented Apr. 28, 1942

2,281,195

UNITED STATES PATENT OFFICE 2,281,195

PACKING

Frank C. Jacobs, New Kensington, Pa.

Application February 2, 1940, Serial No. 316,973

1 Claim. (Cl. 288—15)

My invention relates to packings and the like, and consists in a packing of improved and more effective structure.

Hitherto, packings have been formed of hemp, flax, cotton, asbestos and other organic and mineral fibrous materials, together with known lubricants and filler and binder materials. In some cases wires or strands of ductile metal have been intertwined with the fibrous material, to reinforce and lend greater integrity to the bodies of the packings. And it has been proposed hitherto to include in packing bodies wire springs, metal foil, metal fibres or shavings, steel wool, bands of soft metal, such as lead, Babbitt metal, and soft aluminum, copper, bronze, or other metal filaments that have not been specially hardened and rendered elastic by cold working or thermal treatment. But all of the packings that have been made of these materials have lacked perfection.

The more important structural and functional specifications of the perfect packing may be enumerated, as follows:

1. The material of which the packing is formed must be practically inert to the corrosive or chemical action of the liquid or gas in whose presence the packing is to function;
2. The packing must be impervious to such gas or liquid;
3. The packing must be enduring under the temperatures and pressures to which the packing in service is exposed;
4. The material of which the packing is formed must have a low coefficient of friction;
5. The body of the packing must be elastic, having high "rebound" characteristics—a high coefficient of restitution. And the packing must be capable of retaining all of these characteristics over a prolonged period of service.

Of the several qualities, listed above, the one most difficult to attain is that which is mentioned last: The problem has been to provide a packing that, possessing all of the other requisite characteristics, is elastic and possesses enduring restitutional properties. It is not enough that the body of a packing shall in service be compressed under resiliently applied external stress (such stress as may be applied by a spring-backed packing gland); more specifically, it is desirable, if not essential, that the body of the packing itself shall be elastic, and capable of withstanding continuous vibration without fatigue, and without failure respecting all of the enumerated qualities.

My invention proceeds from the discovery that a mass or cluster of thin, ribbon-like spring filaments may be so included or embedded in a body of suitable packing material as to provide a packing that fulfills all of the requirements. Indeed, I have discovered that in some cases packings may be formed entirely of a matted body of such spring filaments.

In the accompanying drawing Fig. I is a fragmentary view, showing in side elevation a spring filament that is particularly adapted for the construction of my packing, with the apparatus used in the production of the spring shown diagrammatically. Fig. II is a fragmentary view in plan from above of a more refined form of the spring, with the supplemental forming apparatus indicated diagrammatically in dotted lines. Fig. III is a fragmentary view of a modified form of spring filament that may be used in my packing, with the apparatus used in its manufacture illustrated fragmentarily in side elevation. Fig. IV is a fragmentary view, partly in side elevation and partly in vertical section, of an unspecialized form of stuffing-box, with a packing of the invention in assembled position, ready to be compressed by a gland of usual sort. Fig. V is a view comparable with Fig. IV, showing the gland tightened and the packing compressed and in ultimate position of service. In Fig. IV the packing is shown in side elevation, and in Fig. V it is shown in axial section. Fig. VI is a view in axial section of a more elaborate form of stuffing-box and packing, in which the invention has proved particularly valuable.

As those familiar with the art are aware, packings may be obtained on the market in either of two forms; that is to say, a packing may be obtained either as a preformed unit that need only be introduced to a stuffing-box and the packing gland tightened, or it may be obtained as a loose bulk material that must, upon introduction to a stuffing-box, be carefully distributed, shaped, and tamped, before the packing gland can be tightened, to compress the material into the form of a serviceable packing. With these circumstances in mind, it is to be understood that the users of my packing may be supplied in accordance with such usual practice.

The packing of the invention embodies a cluster or maze of thin ribbons of elastic metal, with the bodies of such ribbons or ribbon-like material embedded in the body-forming substance of the packing. The included ribbons not only strengthen the body of the packing and make it more resistant to disintegration, but render it elastic or resilient, and provide in the body substantial rebound or restitutional characteristics. Before considering the structure of the packing in greater detail, I shall describe the materials that are used in its construction.

The body or body-forming substance of the packing, in which the metal ribbons are included, consists of a composition of known materials. Such composition may consist, for example, of flaked lead, or flaked aluminum, or flaked mica, or of cotton, jute, hemp, flax, or asbestos fibres cut into short pieces, and ordinarily the composition will include a bonding material, such as an elastic rubber cement or a resin derived from coal tar or the shells of cashew nuts. Also the composition will in most cases include a lubricant, such as graphite, or powdered soapstone, or zinc oxide, or soap, or other known mineral or organic lubricants. If the temperatures to which the packing is in service exposed are relatively low, such body-forming composition of the packing may consist in any suitable mixture of the above-mentioned materials, but in case the service temperatures are relatively high the composition will consist of flaked mica or comminuted asbestos, with or without a bonding material and a lubricant. If a bonding material is used it will consist, advantageously, in a high-melting-point resin, and the lubricant will be a graphitic or mineral lubricant.

I select with care the material of which the plastic ribbons are formed. In all cases the material is a resilient material of high tensile strength, more particularly a resilient metal. In each case the selection is made, with such matters taken into account as the thermal and chemical conditions of the gases or liquids, to which the packing will be exposed. In some cases brass or bronze is suitable; in other cases Monel metal, or one of the usual carbon steels, is satisfactory; and in still other cases (in which the packings are subjected to the most extreme conditions of temperature and corrosion) stainless steel is particularly effective.

In order to augment the desired effect of the elastic ribbons in the packing body, the ribbons are kinked, or coiled, or curled, or otherwise particularly fashioned. The ribbon-like body of the elastic material may have a thickness of from .001″ to .010″, and a breadth of from .015″ to .070″. When the elastic ribbon is in course of manufacture, the metal is in a relatively ductile condition—the elasticity or resilience of the metal is low. The ultimate, relatively high elasticity of the ribbon is imparted to the metal, either by the cold-working of the metal into the form of the ribbon, or by the heat treating of the metal after it has been so formed. While, as indicated, the ribbon may be curled, or coiled, or kinked, to increase the desired effects or characteristics, I have discovered that a corrugated ribbon is sometimes preferred. It is to be noted that in all of these forms the ribbon is smooth-edged (not ragged), and includes a series of arc-shaped portions. Any ribbon including such a series of arc-shaped portions is embraced in the appended claim by the word "curled."

The ribbon 7 in Fig. I has been found suitable. This ribbon is constructed of wire 1 of from .008″ to .035″ in diameter, formed of a suitable ferrous or non-ferrous metal (depending upon considerations already mentioned). The metal is initially in a ductile condition, but as said it must be a metal that can be either work hardened, or heat hardened, or both work hardened and heat treated, to impart thereto a substantial degree of resilience. A great variety of metals possessing these characteristics are known in the metallurgical art, and this specification need not consider their analyses.

In this case, and preferably in any case, the wire 1 is formed of a metal that, meeting the requirements first mentioned in this specification, gains its required ultimate hardness and elasticity in consequence of cold working alone.

The wire 1 is led through a pair of corrugated rolls 2, 3 and brought into serpentine form, as shown at 4. Passing from the rolls 2, 3, the wire, with the corrugations in common plane, is fed flatwise between a pair of pressure rolls 5, 6, and the undulated body 4 of the wire is flattened into the ribbon-like serpentine filament 7. This is done with the wire in unheated condition, and in consequence of the working of the metal from the form of the wire 1 into the form of the flat, undulated ribbon 7 the metal is toughened and rendered highly elastic. It will be noted that the corrugations lie in the plane of the ribbon, with the opposite smooth edges of the ribbon presented in the crests of such corrugations. Thus, while the resilient body of the filament may be readily flexed in any direction, its flexibility is greater in directions extending transversely of the plane of the undulations than in directions extending in such plane.

In refinement the filament or ribbon 7 may be further particularly fashioned to increase the desired effect of its spring characteristics. For example, the corrugated ribbon 7, appearing edgewise in Fig. II, may be passed through a second pair of corrugated rolls 8 and 9, and corrugated in a transverse direction with respect to the corrugations first formed, providing the doubly corrugated ribbon 10. The second or transverse corrugations extend in this case at an angle of 90° to the common plane of the corrugations first formed. Of course, in producing this doubly corrugated filament, the metal wire used will be such in character that the elasticity and hardness of the filament 7 will not be so great as to prevent the second or final corrugating and metal-working operation.

Other sorts of ribbon-like filaments may be used in the construction of my packing, and in Fig. III a coiled elastic ribbon 7a is shown as one of the permissible variants. The ribbon 7a is formed by passing a wire 1a of suitable metal through rolls 2a and 3a; emerging from these rolls the ribbon 4a is drawn under tension over a sharp corner or edge of a rigidly mounted tool 5a. The filament 4a is held taut upon and drawn over the tool 5a, by means of a clamp 6a that travels on a rail 8a under the influence of a powerfully operated driving rod 9a. This method of coiling or curling wire is known, and apparatus for the purpose appears in the patented art, wherefore further description is needless. Suffice it to say, that, when the tension on the ribbon-like filament drawn over the edge of tool 5a is relieved, the filament forms itself into a coil, as shown at 7a.

In constructing the packing of the invention a single length, or several lengths, of the elastic ribbon (7, or 10, or 7a) is gathered and grouped into a pack, cluster or bunch. The elastic ribbon in the bunch may be carefully arranged in a mass or bunch that conforms (approximately) to the body of the packing under construction, or the ribbon may be gathered at random into a matted mass that will later be more particularly shaped. It is to be noted that the bunch or mass displays universal elasticity; that is, elasticity to any applied force, whatever be the direction of application.

To complete the packing, the spaces or voids in the bunch are filled with an appropriate packing composition, such as one of the compositions, mentioned above, that include a packing material, a bonding material, and a lubricant. Thus, the packing of the invention is formed. It may be supplied to the trade in bulk, with the bonding material maintained in fluid or unset condition. Alternately, it may be molded or otherwise preformed into packing bodies of desired shape, and the bonding material dried or allowed to set or solidify, in such manner that the bodies are retained in the form to which they were molded. In Fig. IV, a preformed packing body 11 of simple tubular form is shown in position in a stuffing-box 12, ready for a packing gland 13 to be tightened, to compress the packing body in fluid-sealing contact with a rotary shaft 14, and in Fig. V the body is shown compressed in such position of service. It will be seen that when the packing is thus compressed the curls or series of arc-shaped portions of the highly elastic ribbon provide within the packing body a multiplicity of stressed arcs or bends that afford in the packing body a high and enduring degree of elasticity.

In Fig. VI a more elaborate structure is illustrated. In the stuffing-box 12a, the packing for shaft 14a is formed into a plurality of conical tube-like bodies 11a, and these bodies are arranged between successive pairs of split-rings 15, 16. The packing-body-engaging faces of the rings are of tapered or conical contour, with the effect that under the compression of gland 13a, the assembly of rings and packing bodies is forced into snug contact with the surface of the shaft.

The concentration of the springs in the body of the packing will be varied, depending upon the particular service for which the packing is intended. In order to express the relation, I have measured, by the liquid displacement method, the absolute volume of the elastic ribbons that go into packings for various services, and have found that the volume of the spring filaments, as thus determined, will vary from 5% to 75% of the total volume of the body of the packing. Indeed, in some cases the body of the packing may with advantage be entirely formed of the elastic ribbons.

If the packing includes a packing composition with the bunch or pack of elastic ribbons, it will be understood that the substance of the composition fills the voids in the mass or bunch of ribbons. If, on the other hand, no packing composition is used in the packing, the bodies of the ribbons themselves will be compressed in such close organization as to close the voids. It is contrary to all expectations that a body so constituted will afford the desired impervious packing between the surfaces of relatively moving machine parts, but the fact is that it will. I have clearly demonstrated that such packings are far superior to packings hitherto known and used, and the good results are particularly notable in installations in which the packings are subjected to high pressures and temperatures, and to extreme vibration.

A packing of the structure described is elastic and has a high coefficient of restitution, and the metal ribbons that form or are included in the packing will be understood to possess (by virtue of the working of the metal into ribbons) a substantial degree of work-hardness and work-induced elasticity. The volume of the packing may under the pressure of a packing gland be changed, with no serious loss in the resilience of the packing body. The packing shapes or adjusts itself in service to the particular form of the stuffing-box in which it is compressed, and it establishes and maintains the desired sealing contact with the parts between which it is organized. The packing has capacity to endure extreme conditions of service without disintegration. Indeed, when secured and compressed between relatively movable parts, my packing operates as a shock-absorber or vibration-dampener.

I claim as my invention:

In a packing seal including a compressible packing body comprising a filamentous metallic reinforcement held under compression between the parts to be sealed against the escape of fluid, the invention herein described in which said reinforcement comprises a mass of curled, smooth-edged ribbon of highly elastic metal which under the effect of said compression forms within the packing body a multiplicity of stressed resilient arcs and affords a packing body of enduring elasticity under conditions of service.

FRANK C. JACOBS.